United States Patent
Finn et al.

(10) Patent No.: US 8,423,478 B2
(45) Date of Patent: Apr. 16, 2013

(54) PREFERRED CUSTOMER SERVICE REPRESENTATIVE PRESENTATION TO VIRTUAL UNIVERSE CLIENTS

(75) Inventors: Peter G. Finn, Brampton (CA); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 12/108,915

(22) Filed: Apr. 24, 2008

(65) Prior Publication Data

US 2009/0271205 A1    Oct. 29, 2009

(51) Int. Cl.
  *G06Q 10/00*  (2012.01)
  *G06F 3/048*  (2006.01)
  *G06F 3/00*   (2006.01)

(52) U.S. Cl.
  USPC ............ 705/304; 715/706; 715/715; 715/751

(58) Field of Classification Search .................. 715/706, 715/757, 751; 705/1.1, 304
  See application file for complete search history.

(56) References Cited

U.S. PATENT DOCUMENTS

| | | | |
|---|---|---|---|
| 6,545,682 B1 * | 4/2003 | Ventrella et al. | 345/473 |
| 6,650,747 B1 | 11/2003 | Bala et al. | |
| 8,165,282 B1 * | 4/2012 | Coughlan et al. | 379/265.11 |
| 2004/0215524 A1 | 10/2004 | Parkyn | |
| 2006/0182261 A1 * | 8/2006 | Grass et al. | 379/265.12 |
| 2006/0268007 A1 * | 11/2006 | Gopalakrishnan | 345/619 |
| 2007/0143127 A1 | 6/2007 | Dodd et al. | |
| 2008/0091692 A1 * | 4/2008 | Keith et al. | 707/100 |
| 2008/0120558 A1 * | 5/2008 | Nathan et al. | 715/764 |
| 2009/0158170 A1 * | 6/2009 | Narayanan et al. | 715/753 |

OTHER PUBLICATIONS

Wood—personalization of online avatar—is messenger as imprtant as the message (Jan. 2005).*

* cited by examiner

*Primary Examiner* — Jami A Plucinski
*Assistant Examiner* — Sangeeta Bahl
(74) *Attorney, Agent, or Firm* — William E. Schiesser; Hoffman Warnick LLC

(57) ABSTRACT

The present invention is directed to presenting customer service representatives to a virtual universe client. A method for presenting a customer service representative (CSR) to a virtual universe client includes obtaining a preference(s) of the virtual universe client, and then presenting a virtual universe customer service representative (CSR) to the virtual universe client, based on the preference that was obtained. The invention allows virtual universe clients ("clients"), or customers, to experience consistent interaction quality with virtual universe CSR's, based on the client's stated preferences and/or interaction history in immersive support centers. This provides for consistency in the CSR experience for the client in that a virtual universe CSR may be staffed by varying human presences "behind" the avatar.

25 Claims, 10 Drawing Sheets

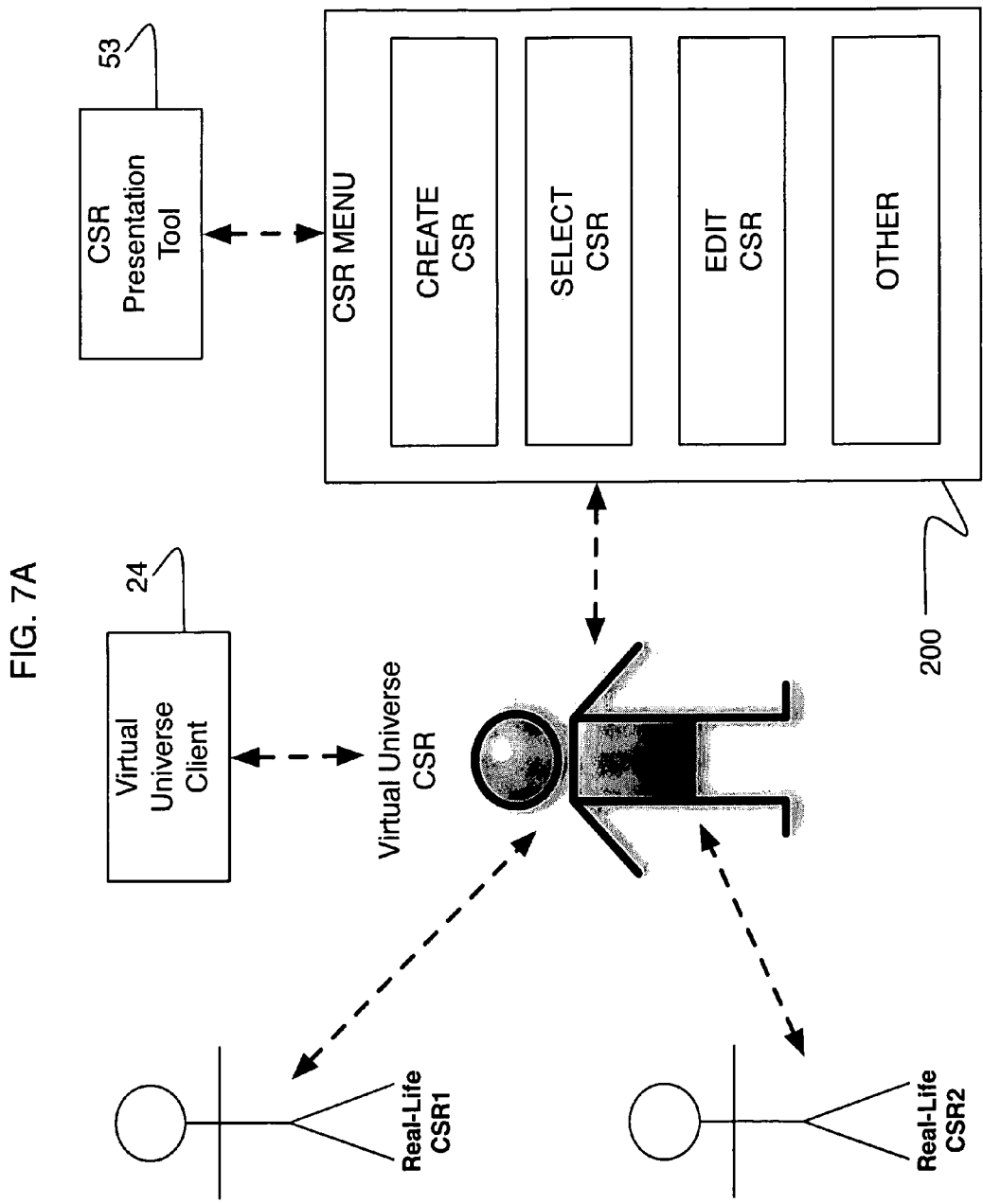

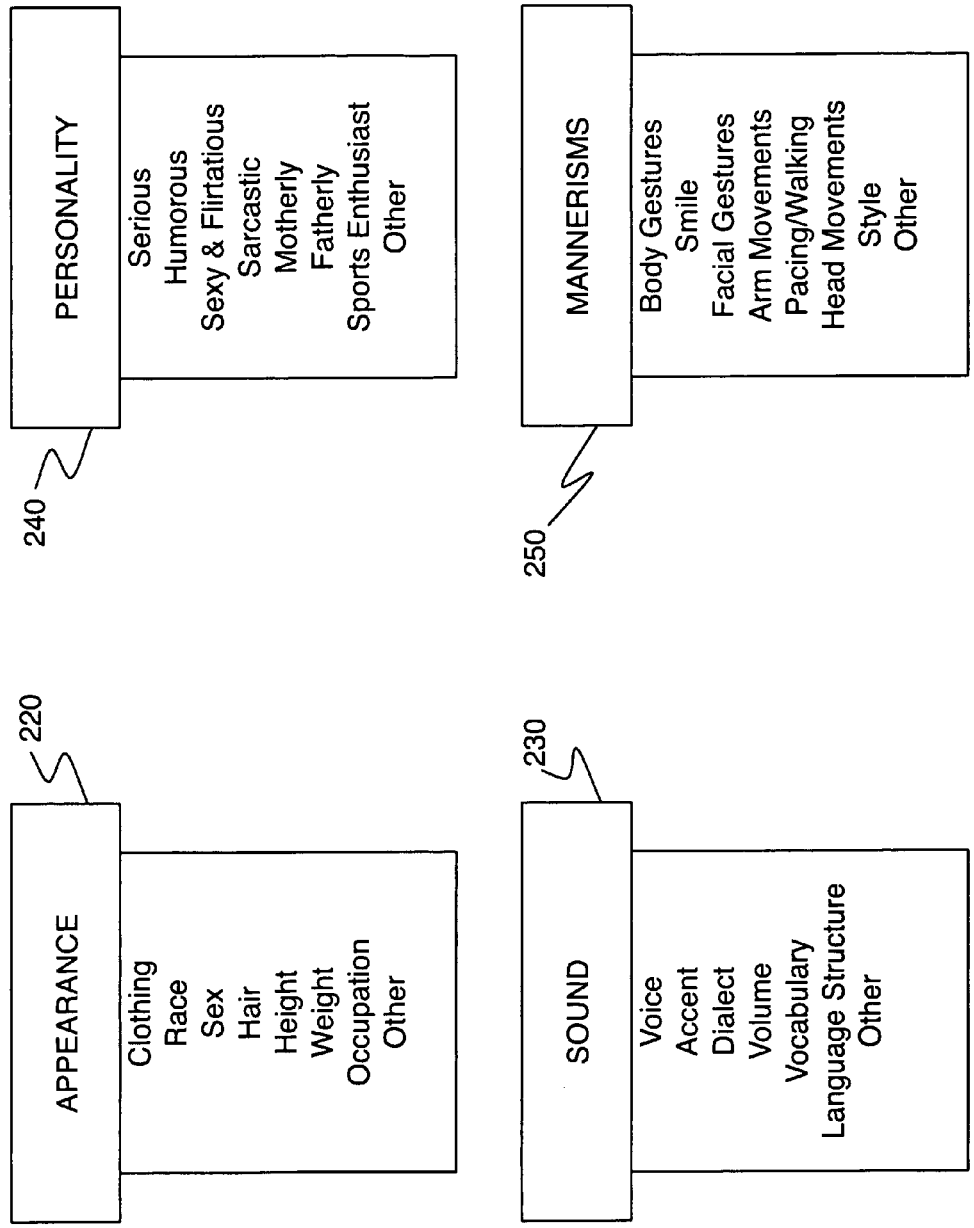

PREFERRED CUSTOMER SERVICE REPRESENTATIVE PRESENTATION TO VIRTUAL UNIVERSE CLIENTS

FIELD OF THE INVENTION

The present invention relates generally to improving an avatar's experience in a virtual universe, and more specifically relates to providing preferred customer service representative presentations to virtual universe clients.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming, exploration, commerce, and travel, as well as real-life simulations in virtual spaces. As virtual environments are becoming increasingly popular for collaboration and conducting day-to-day business, avatars expect their 3D Internet experience to closely replicate that which customers have come to expect and appreciate in the physical world.

Business and service providers in the virtual universe, as in the real, physical world, are constantly seeking ways to improve business by improving the potential customer's experience. An area of consideration in the virtual universe pertains to the customer's interactions with customer service representatives (CSRs) in the commerce setting.

Accordingly, there is an opportunity to improve upon the existing virtual universe experience.

SUMMARY OF THE INVENTION

The present invention is directed to providing preferred customer service representative presentations to virtual universe clients.

A first aspect of the present invention is directed to a method for presenting a customer service representative to a virtual universe client, comprising: obtaining a preference of the virtual universe client; and presenting a virtual universe customer service representative (CSR) to the virtual universe client, based on the preference.

A second aspect of the present invention is directed to a system for presenting a customer service representative to a virtual universe client, comprising: a system for obtaining a preference of the virtual universe client; and a system for presenting a virtual universe customer service representative (CSR) to the virtual universe client, based on the preference.

A third aspect of the present invention is directed to a program product stored on a computer readable medium, which when executed, presents a customer service representative to a virtual universe client, the computer readable medium comprising program code for: obtaining a preference of the virtual universe client; and presenting a virtual universe customer service representative (CSR) to the virtual universe client, based on the preference.

A fourth aspect of the present invention is directed to a method for deploying an application for presenting a customer service representative to a virtual universe client, comprising: providing a computer infrastructure being operable to: obtain a preference of the virtual universe client; and present a virtual universe customer service representative (CSR) to the virtual universe client, based on the preference.

A fifth aspect of the present invention is directed to a business method for presenting a customer service representative to a virtual universe client, the business method comprising: managing a network that includes at least one computer system that performs the process described herein; and receiving payment based on the managing.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIGS. 7A-7C depict schematic views of portions of the presenting of virtual universe CSR preferences in accordance with embodiments of the present invention.

Figure 1:
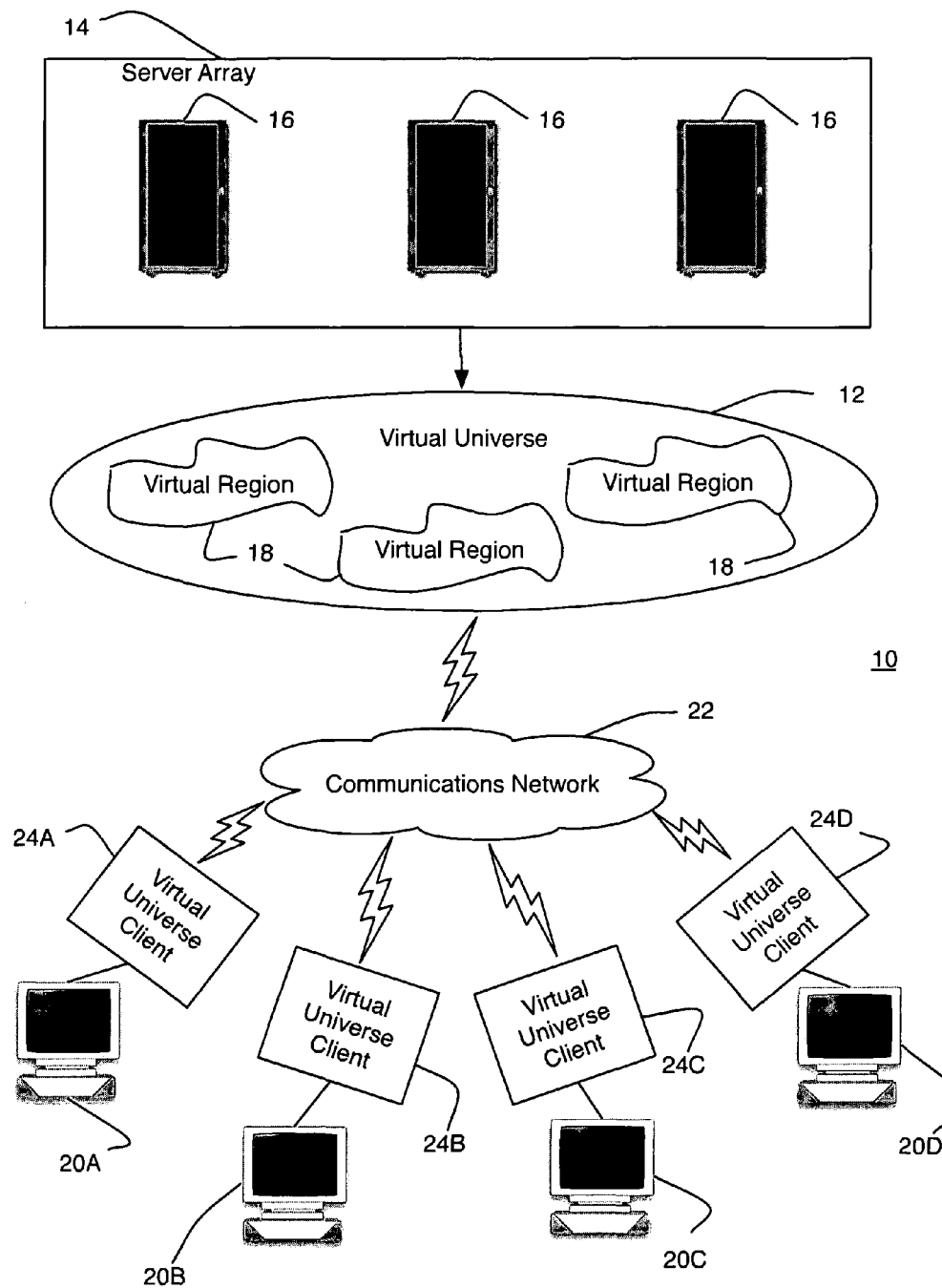
FIG. 1 depicts a high-level schematic diagram showing a networking environment for providing a virtual universe in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention provides preferred customer service representative presentations to virtual universe clients. Aspects of the invention provide a method of presenting a customer service representative to a virtual universe client that includes: obtaining a preference of the virtual universe client; and presenting a virtual universe customer service representative (CSR) to the virtual universe client, based on the preference. Aspects of the invention provide a means for virtual universe clients ("clients"), or customers, to experience consistent interaction quality with virtual universe CSR's, based on the client's stated preferences and/or interaction history in immersive support centers. Aspects of the invention provide for consistency in the CSR experience for the client in that a virtual universe CSR may be staffed by varying human presences behind the avatar.

FIG. 1 shows a high-level schematic diagram showing a networking environment 10 for providing a virtual universe 12 according to one embodiment of this invention in which a service for providing preferred customer service representative presentations to a virtual universe client can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 (e.g., 20A, 20B, 20C, 20D) interact with the virtual universe 12 through a communication network 22 via a virtual universe client 24 (e.g., 24A, 24B, 24C, 24D) that resides in the computer. Below are further details of the virtual universe 12, server array 14, and virtual universe client 24A, 24B, 24C, 24D.

Figure 2:
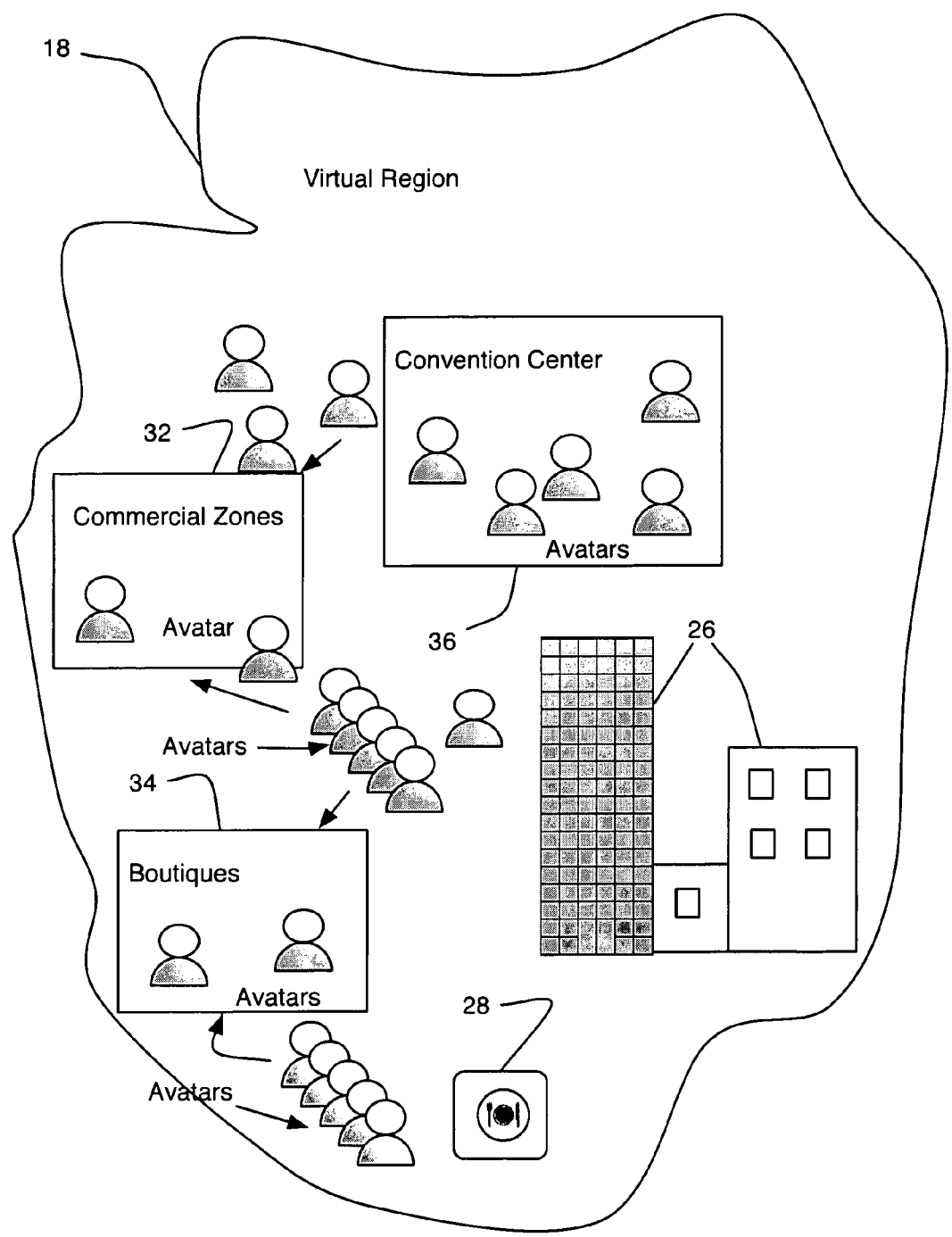
FIG. 2 depicts a more detailed view of a virtual region shown in the virtual universe of FIG. 1 in accordance with an embodiment of the present invention.

FIG. 2 shows a more detailed view of a virtual region shown 18 in the virtual universe 12 of FIG. 1 with avatars concentrated in various locations of the virtual region. As an example, the virtual region 18 shown in FIG. 2 comprises a downtown office center 26, restaurant 28, commercial zones 32 and boutiques 34 for shopping and a convention center 36 for meetings and various conventions. These examples of items in the virtual region 18 shown in FIG. 2 are only illustrative of some things that may be found in a virtual region 18 and those skilled in the art will recognize that these regions can have many more items that can be found in a real-life universe as well as things that do not presently exist in real life.

Residents or avatars which as mentioned above are personas or representations of the users of the virtual universe, roam all about the virtual region by walking, driving, flying or even by teleportation or transportation which is essentially moving through space from one point to another, more or less instantaneously. As shown in FIG. 2, there is a large concentration of avatars in or near the convention center 36, and there are a few avatars at the commercial zones 32 and at the boutique 34 and none at the downtown office center 26 and restaurants 28. Several avatars and/or a group of avatars are queued up to enter the commercial zone 32 and/or the boutique 34. Be it a commercial zone 32, for example, a boutique 34 or any other area of the virtual region 18, the avatar may on occasion interact with a customer service representative (CSR). Conversely, the entities that run the various establishments (e.g., boutique 34, commercial zone 32, convention center 36, etc.) have a self-interest in making the interaction between any virtual universe CSR's and the avatar (i.e., consumer) visiting their establishment more client-friendly. In short, it is good business to offer good service. In any event, aspects of the method provide preferred customer service representative presentations to a virtual universe client 24.

Figure 3:
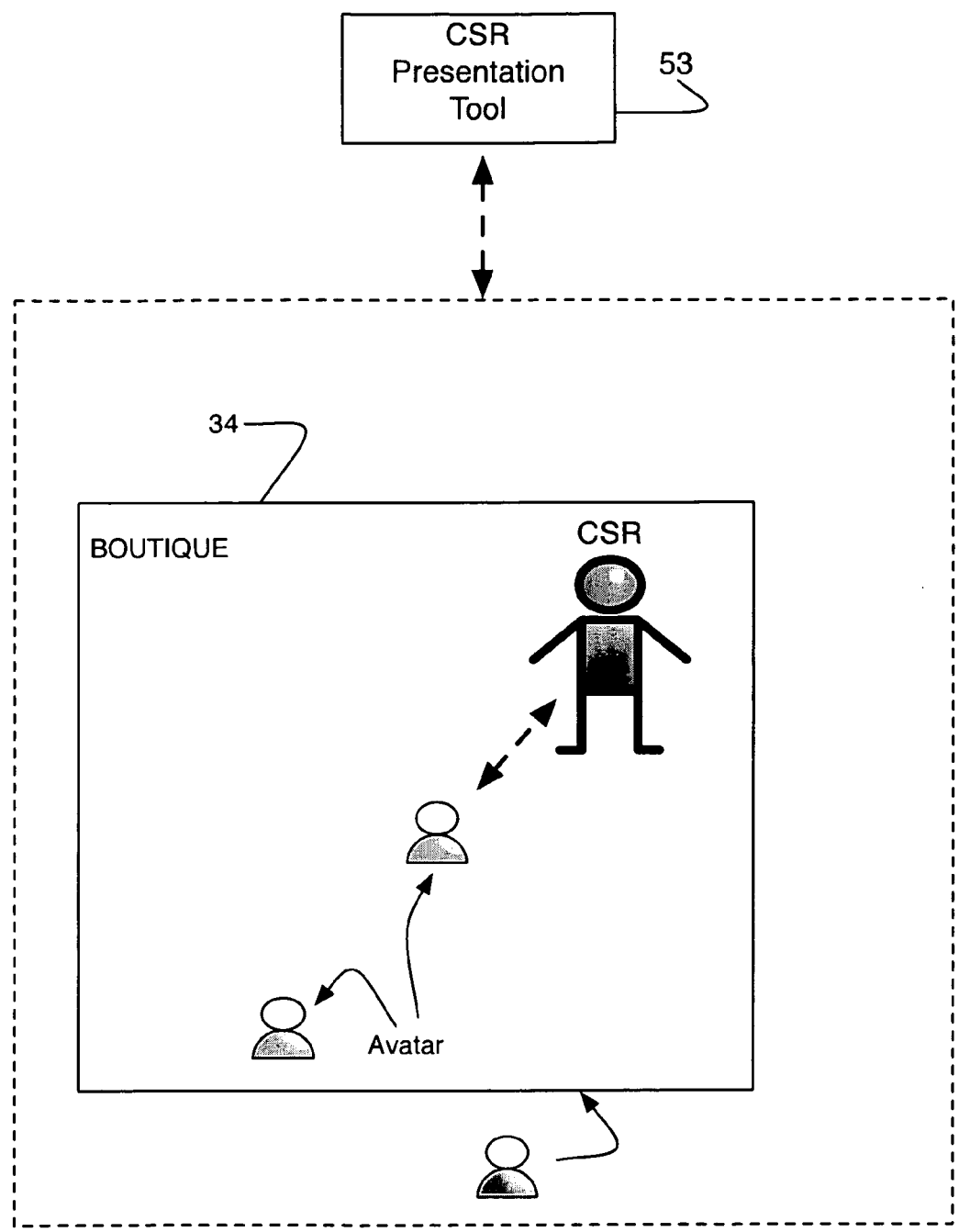
FIG. 3 depicts a more detailed view of a portion of the virtual region shown in FIG. 2 and the presentation of a virtual universe CSR in accordance with an embodiment of the present invention.

As more specifically shown in FIG. 3, an avatar, or group of avatars, may have a customer service need within the virtual universe 12. For example, a single avatar in FIG. 3 may be in a boutique 34 and an interaction with a virtual universe CSR, for any reason, occurs. The reason for the interaction could be virtually anything, or for no reason. For example, it may be a question, a complaint, a request for information, a transaction, and/or the like. The interaction with the virtual universe CSR could simply be triggered by virtue of the avatar entering the boutique 34, or any predefined region. Similarly, the virtual universe CSR may be omnipresent in the boutique 34. As discussed herein, there are a near infinite variety of ways for presenting a virtual universe CSR to a virtual universe client 24 (e.g., avatar, customer, client, etc.) under aspects of the present invention.

In an embodiment, the avatar, or virtual universe (VU) client 24, may like to use a familiar virtual universe CSR (e.g., avatar) named, Suzy, for instance. The VU client 24 may be in the habit of consulting with Suzy when, for example, a banking question arises, and may prefer going back to Suzy for future banking transactions. However, in the virtual region 18, the avatar Suzy may be staffed by many different human beings over the course of the day, based on the day of week, time of day, and/or the like. Under aspects of the present invention, each real human CSR "behind" Suzy may see transcripts of previous interactions with a given VU client 24, and the client's profile, based on the client avatar's name. For example, if avatar John Doe is a client, his profile is on record, and each time John Doe has an interaction with a virtual universe CSR data is stored in a database and can be either manually or automatically displayed to the next human CSR that John Doe has contact with via a virtual universe CSR. Additionally, the VU client 24 may have a single preferred virtual universe CSR embodiment for all situations. In another embodiment, the VU client 24 may prefer different virtual universe CSR presentations based on the VU client 24 activity. For example, the client preference may be Suzy is the virtual universe CSR as a bank teller, while Tommy is the virtual universe CSR as the barkeeper, and/or a random display of the virtual universe CSR may be presented.

Figure 4:
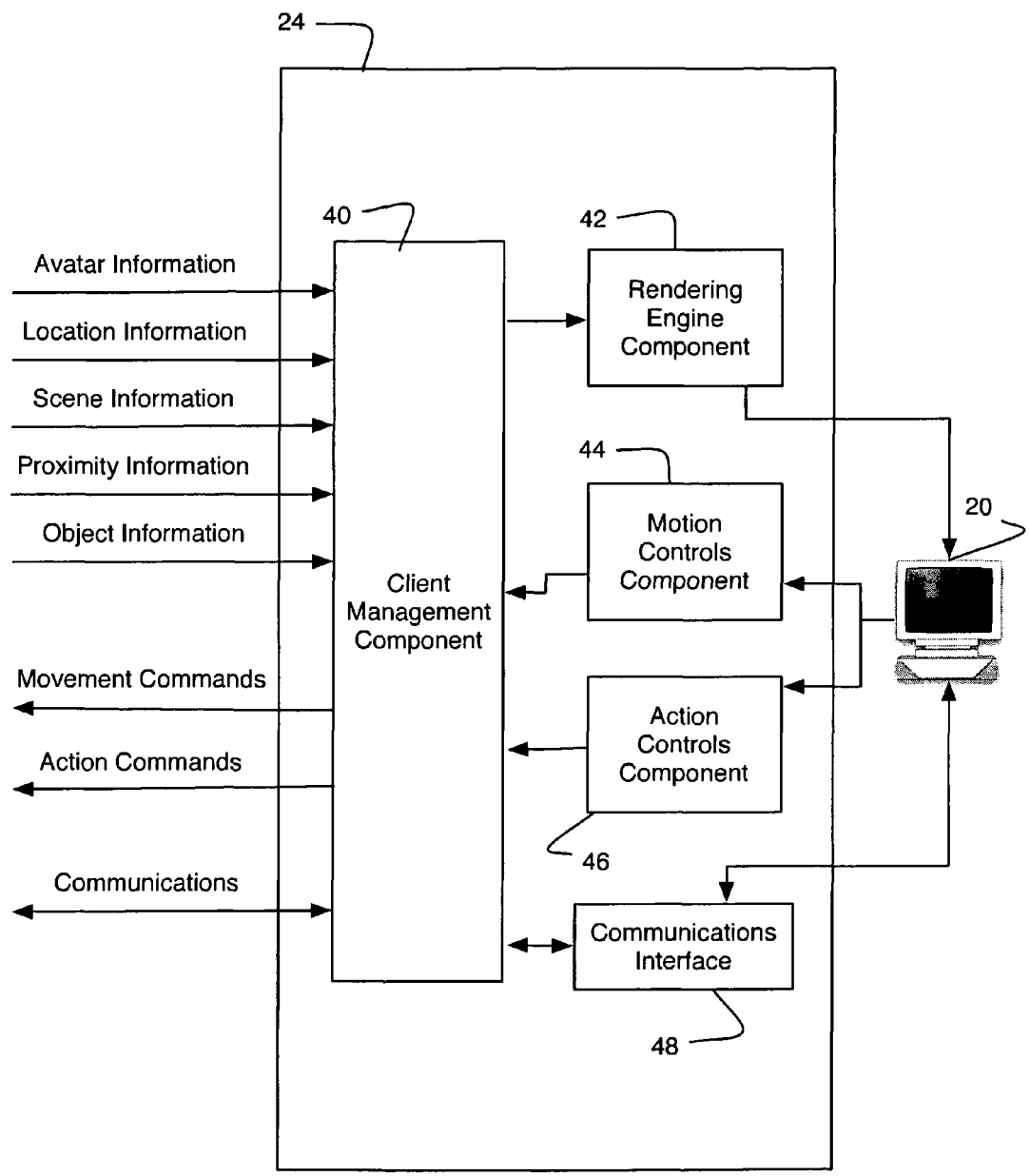
FIG. 4 depicts a more detailed view of the virtual universe client shown in FIG. 1 in accordance with an embodiment of the present invention.

FIG. 4 shows a more detailed view of the VU client 24A, 24B, 24C, 24D shown in FIG. 1. The VU client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 (e.g., 20A, 20B, 20C, 20D at FIG. 1) to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 4 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 4 also shows the movement commands and action commands that are generated by the user that are sent to the server array via the client management component 40, as well as the communications that can be sent to the users of other avatars within the virtual universe.

Figure 5:
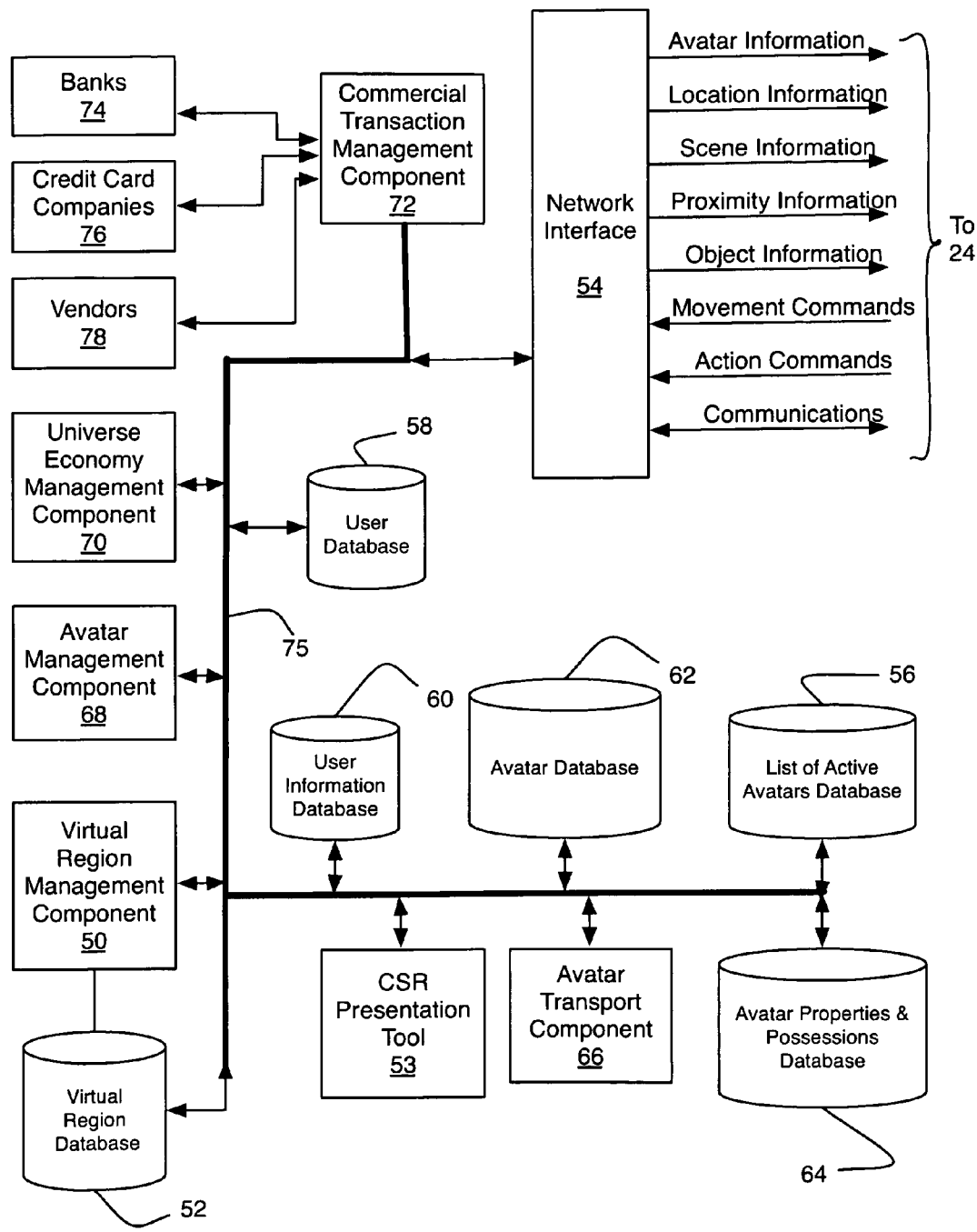
FIG. 5 depicts a more detailed view of some of the functionalities provided by the server array shown in FIG. 1 in accordance with an embodiment of the present invention.

FIG. 5 shows a more detailed view of some of the functionalities provided by the server array 14 shown in FIG. 1. In particular, FIG. 5 shows a virtual region management component 50 that manages a virtual region within the virtual universe. In particular, the virtual region management component 50 manages what happens in a particular region such as the type of landscape in that region, the amount of homes, commercial zones, boutiques, bridges, highways, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

A CSR presentation tool 53 provides preferred customer service representative presentations to VU clients 24. Below is a more detailed discussion of the CSR presentation tool 53 and how it provides preferred customer service representative presentations to VU clients 24, including a discussion on how the tool 53 obtains a preference of the VU client 24; and present a virtual universe CSR to the VU client 24, based on the preference.

FIG. 5 shows a network interface 54 that enables the server array 14 to interact with the VU client 24 residing on computer 20. In particular, the network interface 54 communicates information that includes information pertaining to avatars, location, trajectory, scene, proximity and objects to the user through the VU client 24 and receives movement and action commands as well as communications from the user via the VU client 24.

As shown in FIG. 5, there are several different databases for storing information. In particular, database 56 contains a list of all the avatars that are on-line in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 5 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 to facilitate such a transaction.

The components in FIG. 5 are all interconnected via an interconnect 75. Although shown in FIG. 5 as connected via interconnect 75, all of the components may be configured to interact with each other using other means now known or later developed. The components that are shown as being interconnected via interconnect 75 are illustrated in that manner to convey the close interactions that exist between these components such as the banks 74, credit card companies 76, and vendors with the commercial transaction management component 72.

Figure 6:
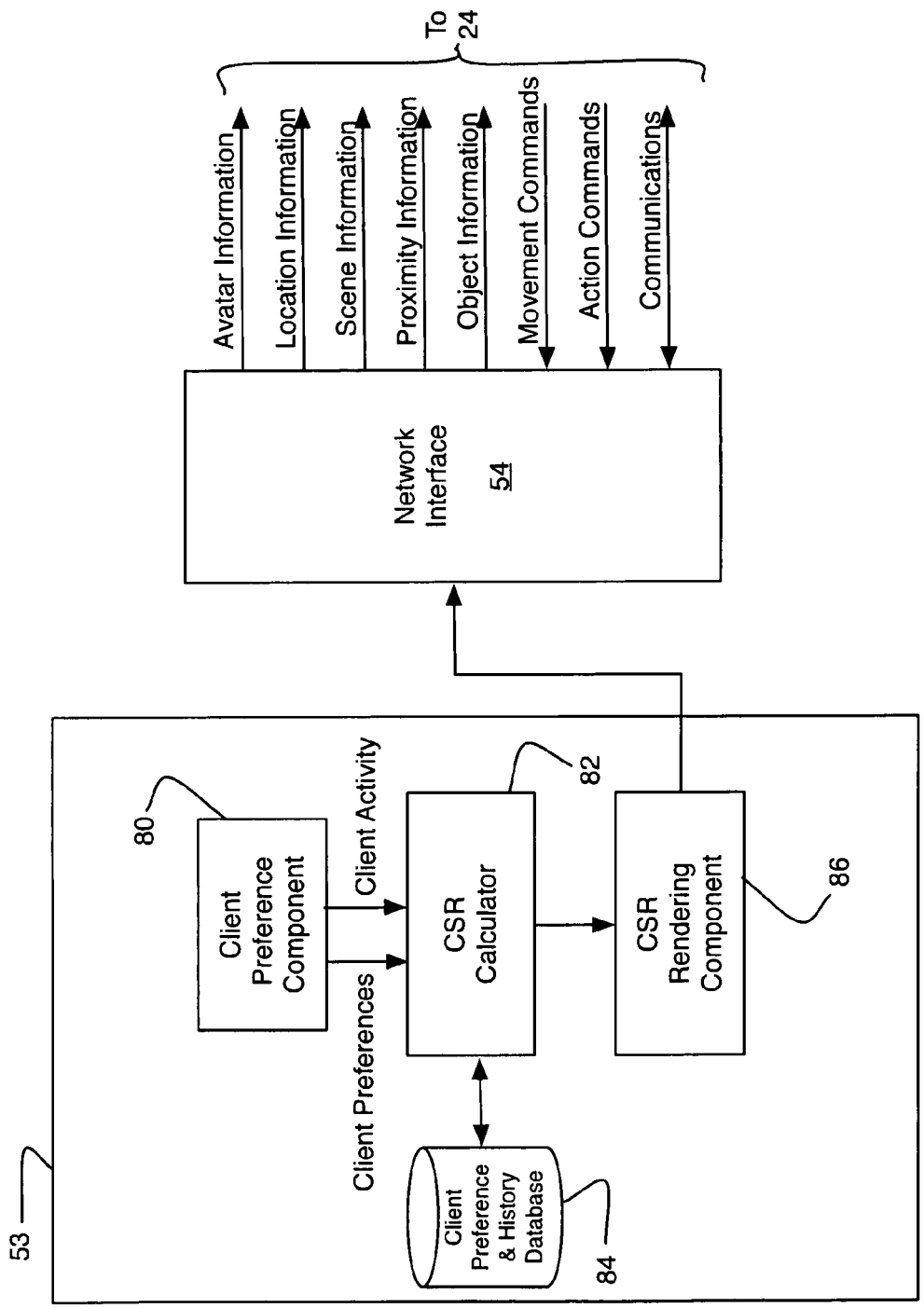
FIG. 6 depicts a more detailed view of a CSR presentation tool in FIG. 5 in accordance with an embodiment of the present invention.

FIG. 6 shows a more detailed view of a CSR presentation tool 53 shown in FIG. 5 according to one embodiment of this invention. As mentioned above, the user CSR presentation tool 53 provides preferred customer service representative presentations to VU clients 24. As shown in FIG. 6, in one embodiment, the CSR presentation tool 53 resides on a computer system that is a part of the server array 14 and communicates directly to the virtual universe and its residents via the VU client 24. In other embodiments, the CSR presentation tool 53 might reside on separate computers in direct communication with the virtual universe servers 16 and VU clients 24.

The CSR presentation tool 53 comprises a client preference component 80, a CSR calculator 82, and a CSR rendering component 86. The CSR calculator 82 is further in communication with a client preference and history database 84. The client preference component 80 is configured to obtain preferences of the VU client 24. CSR calculator 82 and CSR rendering component 86 are configured to present a virtual universe CSR to the VU client 24, based on the obtained preferences.

The visual and/or aural display of the virtual universe CSR to the VU client 24 may be presented in a variety of ways, based on several factors. The display may be based on the VU client 24 explicitly creating a virtual universe CSR avatar of his/her preference. For example, a menu may be made available to the VU client 24, via the client preference component 80, that offers various virtual universe CSR embodiments. Similarly, the display of the virtual universe CSR may be based on VU client 24 profile data stored in the client preference and historical database 84. The client's historical interaction with avatars and/or virtual universe CSR's, stored in the client preference and historical database 84 may also affect the virtual universe CSR presented. Other methodologies are available under the present invention that allow for the customization of an aspect of the virtual universe CSR presented to the VU client 24.

Under aspects of the present invention an aural aspect (e.g., voice, dialect, accent, etc.) of the virtual universe CSR may be presented based on a preference of the VU client 24. The presented virtual universe CSR may, for example, maintain a consistent sounding voice, using Voice Over Internet Protocol (VOIP), for example, so that the virtual universe CSR's voice is not that of the real-life CSR that is 'on duty' at that particular moment backing up the virtual universe CSR. An embodiment may use a technology, such as VOIP, to achieve audio consistency by having the speech of the real-life on-duty CSR converted to an intermediate text, and then have a corollary conversion back to a consistent voice for the virtual universe CSR avatar. In another embodiment, the voice of the virtual universe CSR may be culled from a collection of prerecorded clips that are stored, for example, in the client preference and historical database 84. In still another embodiment, a synthesized voice that does not rely on previously recorded clips may be presented by the virtual universe CSR.

A choice of voices, via a sampling menu of all voices, may be offered to the VU client 24 for use with the virtual universe CSR in an embodiment. In another embodiment, regional accents and/or dialects may be selected. For example, a southern drawl, a New Jersey accent, a valley girl accent, a heavy smoker's voice, and/or the like could be offered as available voices for the virtual universe CSR. The choice of voices allows the VU client 24 to have a consistency of experience that is desired using a self-customizable interface. Thus, the voice for the virtual universe CSR may be provided via: a real-CSR-text to synthesized voice; real-CSR-voice converted, decoded, and re-encoded as synthesized voice; real-CSR-text to recorded voice snippets; real-CSR-voice to recorded voice snippets; and/or the like. In any event, the aural aspects of the virtual universe CSR may be customized based on the preference of the VU client 24.

In another embodiment of the invention, a personal trait of the virtual universe CSR may be presented based on a preference of the VU client 24. For example, the VU client 24 may be presented with a variety of available personality types to select for the virtual universe CSR. The client preference and historical database 84 may store, for example, a VU client 24 profile that includes a list of personality types therein. In this manner, the VU client 24 is free to select a personality for one, several, or all the virtual universe CSR encountered. For example, the VU client 24 may choose that a first virtual universe CSR, Suzy, is "all business", while a second virtual universe CSR, Tommy, is humorous. Examples of personality types that may be applied to one, several, or all virtual universe CSRs either singularly, or in combination, include: all business, serious, humorous, sexy and flirtatious, sarcastic, witty, motherly, fatherly, sports enthusiast, slow, dim-witted, quick, intelligent, etc. Clearly, to one of skill in the art, a near infinite variety of personality types and combinations thereof are available for administering to a virtual universe CSR under embodiments of the present invention.

In another embodiment of the invention, a physical trait of the virtual universe CSR besides appearance, voice, and/or the like may be presented based on a preference of the VU client 24. For example, the virtual gestures of the virtual universe CSR may be selected by the VU client 24. Gestures may be selected by the VU client 24 and/or may be based on a profile stored in the client preference and historical database 84. Gestures include, for example, smile, facial gestures, arm movements (e.g., shaking hands, pointing, stroking beard, pat on back, scratching head, etc.), pacing, walking, nodding, shaking head, and/or the like.

Under aspects of the present invention, the VU client 24 may be able to modify the virtual universe CSR at any time. For example, if the VU client 24 becomes tired of virtual universe CSR "Suzy", preferences may be simply modified, thereby allowing the VU client 24 to change the virtual universe CSR presented. Aspects of the invention enhance the VU client's virtual universe CSR experience by providing consistency in presentation of the desired audio and/or visual interface, along with an ability to modify and manage the interfaces.

Figure 7B:
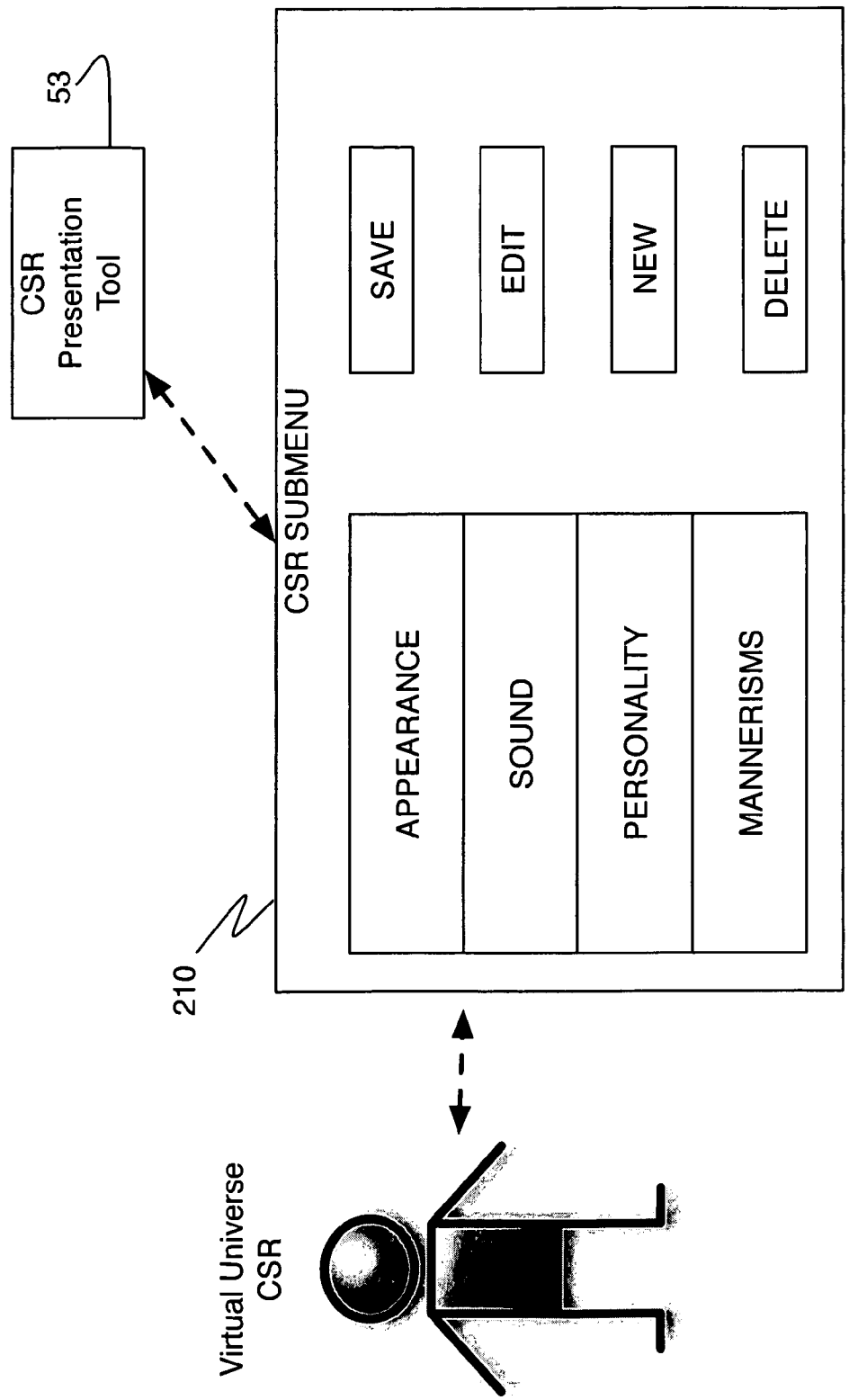

Referring to FIGS. 7A through 7C, an embodiment is depicted that shows obtaining preference(s) from a VU client 24 (e.g. customer) so as to present a virtual universe CSR based on the preference(s). As shown in FIG. 7A, a virtual universe CSR may be created, selected, edited, and/or the like via a CSR menu 200 offered by the CSR presentation tool 53. In this manner, the virtual universe CSR is fully customizable and editable by the VU client 24. A further advantage of the embodiment is it provides a consistency in the CSR experience for the VU client 24. For example, regardless of what real-life CSR is manning the virtual universe CSR at any particular time, the virtual universe CSR is presented a consistent manner. As shown, a plurality of different real-life CSRs (e.g., "Real-Life CSR1", "Real-Life CSR2", etc.) can operate the virtual universe CSR, yet the virtual universe CSR is presented independent of who is physically manning the virtual universe CSR. As show, the CSR menu 200 may include a variety of options, including "Create CSR", "Select CSR", "Edit CSR", "Other", and/or the like.

Similarly, as FIG. 7B depicts, a variety of aspects of the virtual universe CSR may be presented to the VU client 24 via, for example, a CSR submenu 210. The various aspects may be saved, edited, added, and/or deleted, as shown by the buttons on the submenu 210. Aspects may include any visual, audio or aural, and/or behavioral aspect, and combinations thereof that may be adjusted on the virtual universe CSR. For example, as shown in the CSR submenu 210, the appearance, sound, personality, and mannerisms may all be adjusted. As FIG. 7C shows, appearance aspects options 220 may include clothing, race, sex, hair, height, weight, occupation, and/or the like that effect the physical appearance of the virtual universe CSR. Similarly, sound aspects options 230 may include voice, accent, dialect, volume, vocabulary, language structure, and/or the like that effect the audio aspects of the virtual universe CSR. Personality aspect options 240 may include serious, humorous, sexy and flirtatious, sarcastic, motherly, fatherly, sports enthusiast, and/or the like. Also, mannerism aspect options 250 may include body gestures, facial gestures, arm movements, head movements, pacing/walking, smile, style, and/or the like. One of skill in the art should realize that under aspects of the present invention other aspects of the virtual universe CSR are available to present to the VU client 24. Similarly, other means and methodologies besides a menu-driven system are available for both obtaining preferences and for presenting the preferred virtual universe CSR.

In another embodiment of the invention, the CSR presentation tool 53 is used as a service to charge fees for each user, or group of users, that have a preferred CSR presented to them. In this embodiment, the provider of the virtual universe or a third party service provider could offer this CSR presentation tool 53 as a service by performing the functionalities described herein on a subscription and/or fee basis. In this case, the provider of the virtual universe or the third party service provider can create, deploy, maintain, support, etc., the CSR presentation tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to provide preferred customer service representative presentations to virtual universe clients. In this case, the CSR presentation tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 8:
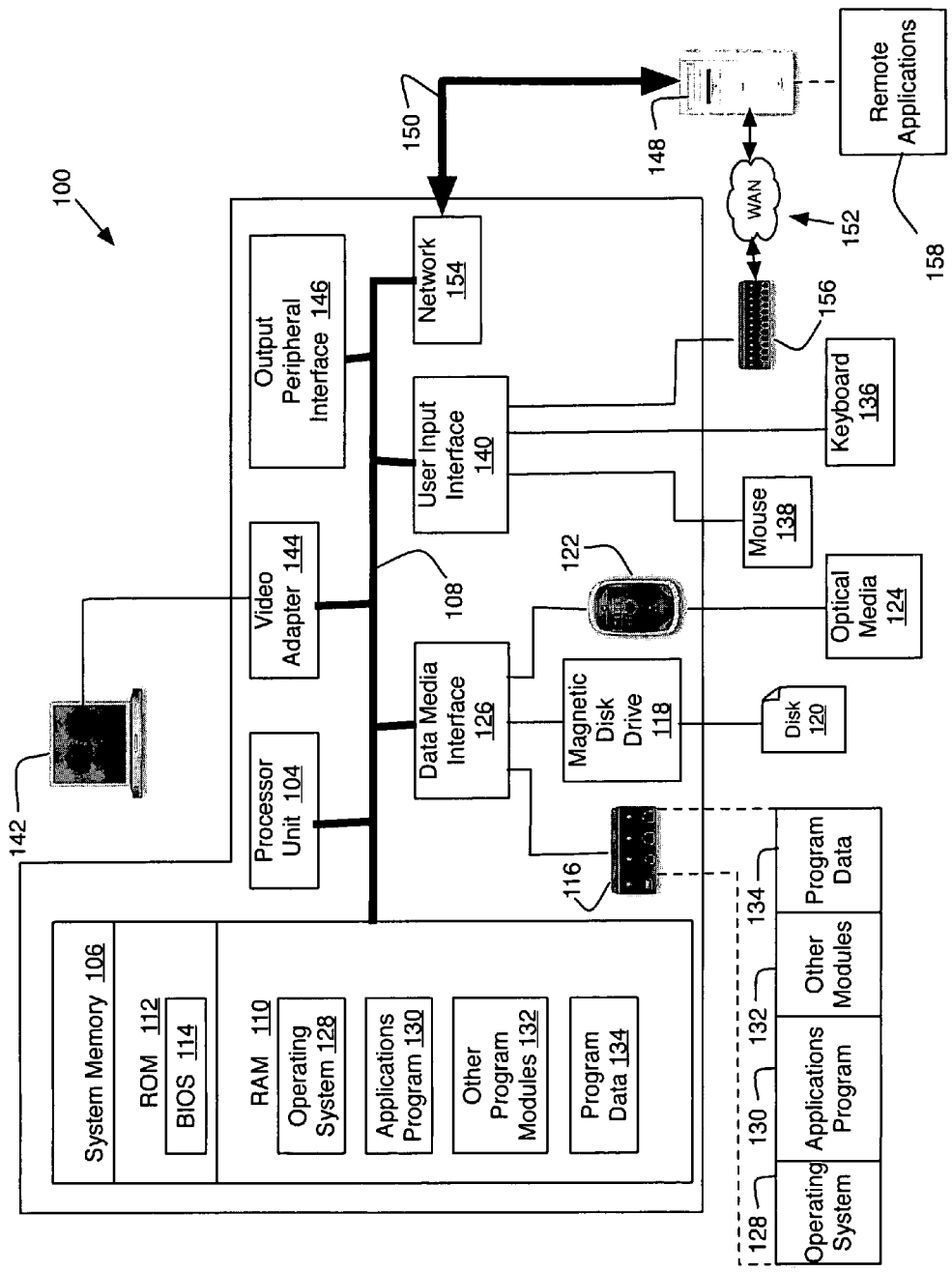
FIG. 8 depicts an illustrative computer system for implementing embodiment(s) of the present invention.

FIG. 8 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 8.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 8, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 8, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 8 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130 (e.g., client preference component 80, CSR calculator 82, CSR rendering component 86, etc.), other program modules 132, and program data 134. Each of the operating system 128, one or more application programs 130, other program modules 132, and program data 134 or some combination thereof, may include an implementation of the networking environment 10 of FIG. 1 including the server array 14, the VU client 24 and the CSR presentation tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 8 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 8 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing preferred customer service representative presentations to virtual universe clients. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for presenting a customer service representative to a virtual universe client, comprising:
   obtaining a preference of the virtual universe client, the preference designating one of a plurality of visual or aural features of the virtual universe client;
   constructing by a computer device, in response to the obtaining, a customized customer service representative (CSR) having a feature corresponding to the preference, the customized customer service representative being associated with an entity other that the virtual universe client; and
   presenting, by the computer device, the CSR to the virtual universe client; wherein the CSR is presented for the virtual universe client to interact with whenever the virtual universe client performs a particular activity in the virtual world that involves interaction with the entity;
   wherein a different CSR having different preference-based features is presented for the virtual universe client to interact with whenever the virtual universe client performs a different activity in the virtual world that involves interaction, the different activity including at least one of a different type of transactions or a transaction with a different entity; and
   wherein a second different CSR having other different preference-based features is presented for a different virtual universe client to interact with whenever the different virtual universe client performs the particular activity in the virtual world that involves interaction with the entity.

2. The method of claim 1, further comprising storing a previous transaction of the virtual universe client.

3. The method of claim 1, the presenting comprising adjusting at least one of a visual or aural aspect of the virtual universe CSR based on the preference.

4. The method of claim 3, wherein the visual aspect is at least one selected from a group consisting of: clothing, race, sex, hair, height, weight, and occupation.

5. The method of claim 3, wherein the aural aspect is at least one selected from a group consisting of: voice, accent, dialect, volume, vocabulary, and language structure.

6. The method of claim 1, wherein the preference is derived from an activity of the virtual universe client.

7. The method of claim 1, the presenting comprising displaying the virtual universe CSR based on at least one of: client profile data, client creating a preference, or historical interaction with avatars.

8. The method of claim 1, further comprising presenting the virtual universe CSR upon entrance of the virtual universe client into a region.

9. The method of claim 1, wherein the preference is customizable by the virtual universe client.

10. The method of claim 1, the presenting further comprising presenting a personality trait of the virtual universe CSR.

11. The method of claim 1, the presenting further comprising presenting a mannerism of the virtual universe CSR.

12. The method of claim 11, wherein the mannerism is at least one selected from a group consisting of: a body gesture, a facial gesture, an arm movement, a walking movement, a head movement, and a smile.

13. The method of claim 1, wherein the virtual universe CSR is independent of a real-life CSR manning the virtual universe CSR.

14. A system for presenting a customer service representative to a virtual universe client, comprising at least one computer device that performs a method, comprising:
   obtaining a preference of the virtual universe client, the preference designating one of a plurality of visual or aural features of the virtual universe client;
   constructing, in response to the obtaining, a customized customer service representative (CSR) having a feature corresponding to the preference, the customized customer service representative being associated with an entity other that the virtual universe client; and
   presenting the CSR to the virtual universe client,
   wherein the CSR is presented for the virtual universe client to interact with whenever the virtual universe client performs a particular activity in the virtual world that involves interaction with the entity;
   wherein a different CSR having different preference-based features is presented for the virtual universe client to interact with whenever the virtual universe client performs a different activity in the virtual world that involves interaction, the different activity including at least one of a different type of transactions or a transaction with a different entity; and
   wherein a second different CSR having other different preference-based features is presented for a different virtual universe client to interact with whenever the different virtual universe client performs the particular activity in the virtual world that involves interaction with the entity.

15. The system of claim 14, the method further comprising storing a previous transaction of the virtual universe client.

16. The system of claim 14, the method further comprising presenting the virtual universe CSR upon entrance of the virtual universe client into a region.

17. The system of claim 14, the presenting further comprising presenting a personality trait of the virtual universe CSR.

18. The system of claim 14, the presenting further comprising presenting a mannerism of the virtual universe CSR.

19. The system of claim 14, wherein the virtual universe CSR is independent of a real-life CSR manning the virtual universe CSR.

20. A program product stored on a computer readable storage device, which when executed, presents a customer service representative to a virtual universe client, the computer readable medium comprising program code for:
   obtaining a preference of the virtual universe client, the preference designating one of a plurality of visual or aural features of the virtual universe client;
   constructing, in response to the obtaining, a customized customer service representative (CSR) having a feature corresponding to the preference, the customized customer service representative being associated with an entity other that the virtual universe client; and
   presenting the CSR to the virtual universe client,
   wherein the CSR is presented for the virtual universe client to interact with whenever the virtual universe client performs a particular activity in the virtual world that involves interaction with the entity;
   wherein a different CSR having different preference-based features is presented for the virtual universe client to interact with whenever the virtual universe client performs a different activity in the virtual world that involves interaction, the different activity including at least one of a different type of transactions or a transaction with a different entity; and
   wherein a second different CSR having other different preference-based features is presented for a different virtual universe client to interact with whenever the different virtual universe client performs the particular activity in the virtual world that involves interaction with the entity.

21. The program product of claim 20, the program code further comprising storing a previous transaction of the virtual universe client.

22. The program product of claim 20, the program code further comprising presenting the virtual universe CSR upon entrance of the virtual universe client into a region.

23. The program product of claim 20, the program code further comprising presenting a personality trait of the virtual universe CSR.

24. The program product of claim 20, the program code further comprising presenting a mannerism of the virtual universe CSR.

25. A method for deploying an application for presenting a customer service representative to a virtual universe client, comprising:
   providing a computer infrastructure having at least one computer device performing a method, comprising:
      obtaining a preference of the virtual universe client, the preference designating one of a plurality of visual or aural features of the virtual universe client;
      constructing by the computer device, in response to the obtaining, a customized customer service representative (CSR) having a feature corresponding to the preference, the customized customer service representative being associated with an entity other that the virtual universe client; and presenting by the computer device the CSR to the virtual universe client,
wherein the CSR is presented for the virtual universe client to interact with whenever the virtual universe client performs a particular activity in the virtual world that involves interaction with the entity;
wherein a different CSR having different preference-based features is presented for the virtual universe client to interact with whenever the virtual universe client performs a different activity in the virtual world that involves interaction, the different activity including at least one of a different type of transactions or a transaction with a different entity; and
wherein a second different CSR having other different preference-based features is presented for a different virtual universe client to interact with whenever the different virtual universe client performs the particular activity in the virtual world that involves interaction with the entity.

* * * * *